Patented Feb. 11, 1930

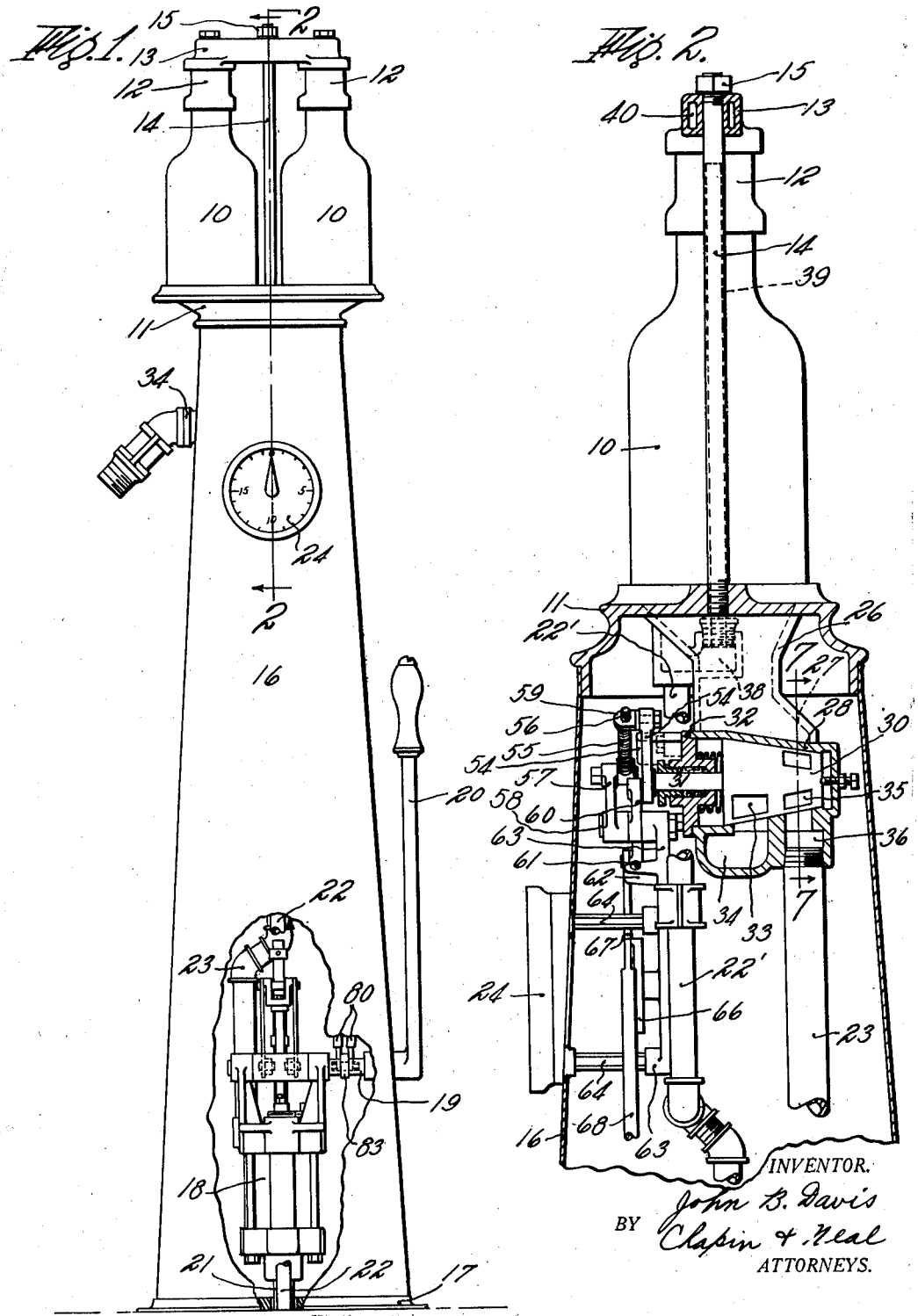

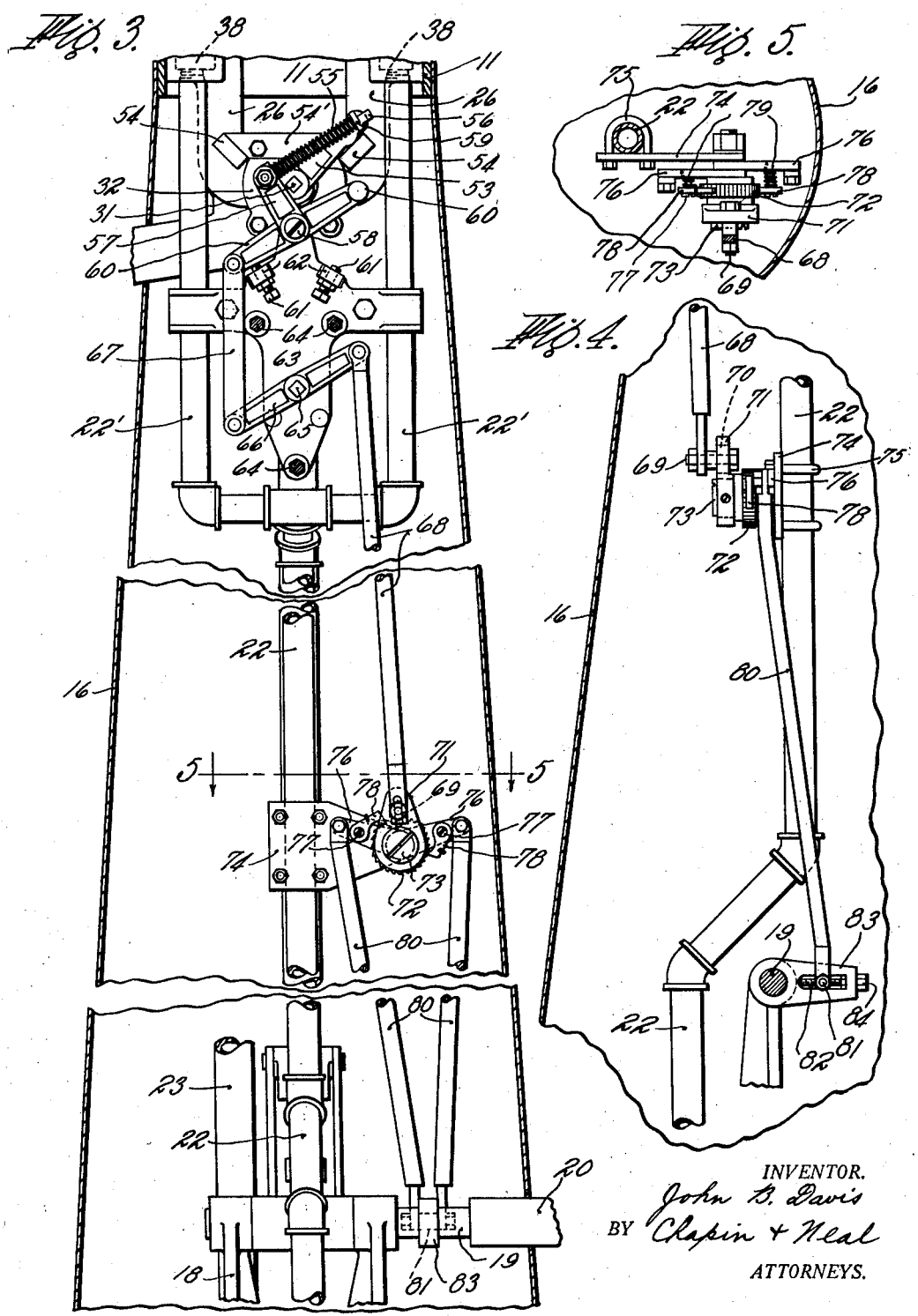

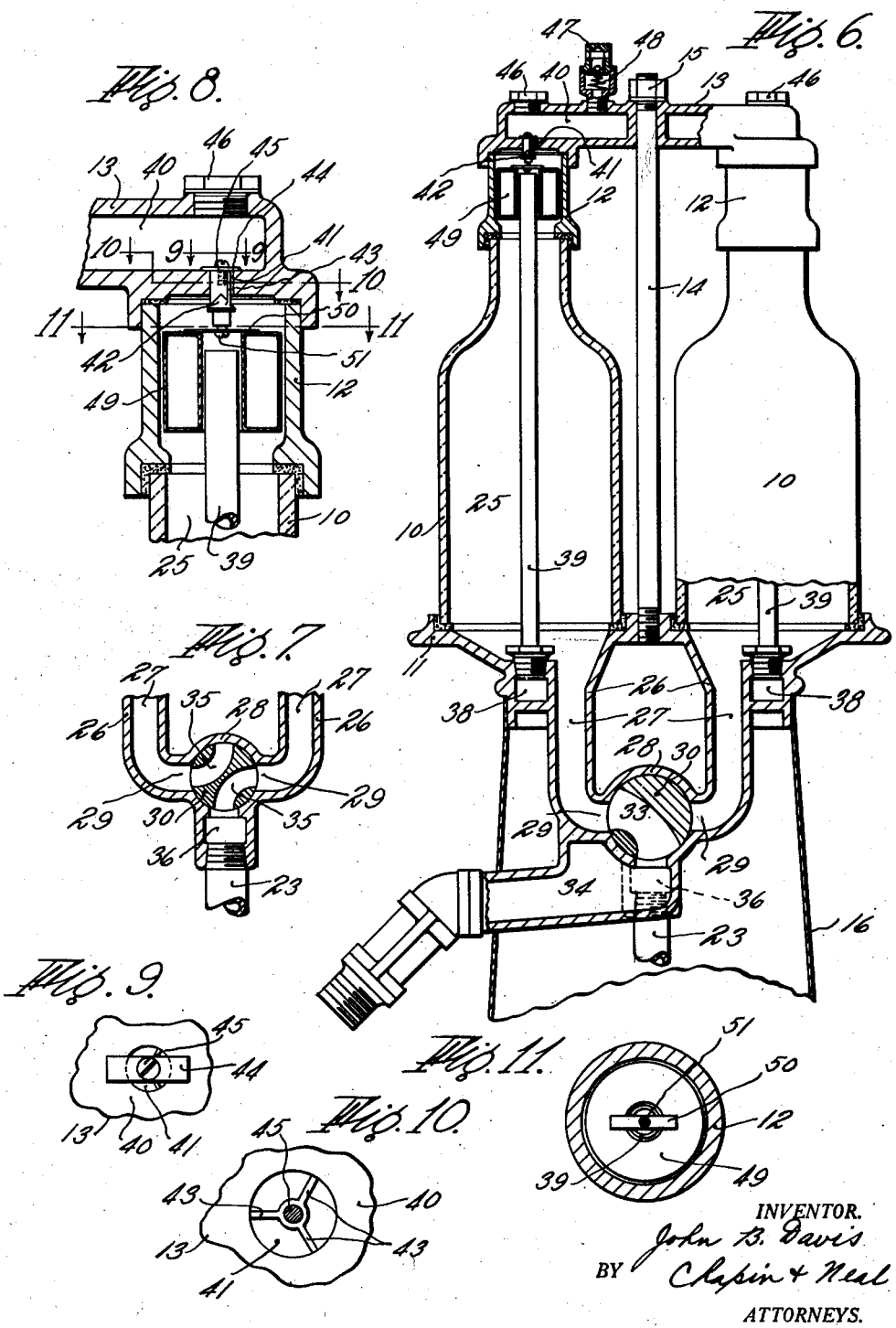

1,746,382

UNITED STATES PATENT OFFICE

JOHN B. DAVIS, OF SPRINGFIELD, MASSACHUSETTS, ASSIGNOR TO GILBERT & BARKER MANUFACTURING COMPANY, OF WEST SPRINGFIELD, MASSACHUSETTS, A CORPORATION OF MASSACHUSETTS

LIQUID-DISPENSING APPARATUS

Application filed September 14, 1927. Serial No. 219,544.

This invention relates to improvements in liquid dispensing apparatus, such as is commonly used for dispensing gasoline, oils and the like.

The particular type of dispensing apparatus, with which this invention is concerned, is that wherein two measuring chambers, usually of the so-called visible type, are arranged, in connection with suitable supply and discharge passages and a controlling valve mechanism therefor, so that one chamber may be supplied with liquid while the other is discharging the measured quantity of liquid therein. The invention is likewise directed to an apparatus of this type, wherein the controlling valve mechanism is automatically actuated to reverse the connections of the supply and discharge passages to the measuring chambers after one of the chambers has been filled with liquid to the desired level.

There are several examples in the prior art of liquid dispensing apparatus of the general class, above referred to, and these provide for the automatic operation of the controlling valve mechanism. They necessitate, however, the building up of a pressure on the liquid in the measuring chamber, which is usually of glass.

One object of this invention is to provide means for automatically operating the valve mechanism without requiring that the liquid in the measuring chambers be placed under pressure.

More particularly, the invention has for an object to connect the valve operating mechanism to a moving part of the liquid supply pump so that the movement of the valve will be timed with the pump so as to operate after a predetermined extent of operation of the pump and thus after a predetermined quantity of liquid has been delivered to one of the measuring chambers.

Other objects pertaining to related and subsidiary features, will appear in the following description and will be pointed out in the appended claims.

The invention will be disclosed with reference to the accompanying drawings, in which:—

Fig. 1 is a small scale exterior elevational view of a liquid dispensing apparatus embodying the invention;

Fig. 2 is a fragmentary cross sectional view taken on the line 2—2 of Fig. 1;

Fig. 3 is a fragmentary elevational view, taken from the same direction as Fig. 1 but partly in section, showing the parts housed within the pump casing and particularly the complete valve operating mechanism;

Fig. 4 is a fragmentary view, taken at right angles to Fig. 3, showing part of the linkage for initiating the operation of the valve mechanism;

Fig. 5 is a fragmentary sectional plan view taken on the line 5—5 of Fig. 3;

Fig. 6 is a sectional elevational view showing the measuring cylinders and controlling valve;

Fig. 7 is a fragmentary sectional view of the controlling valve taken on the line 7—7 of Fig. 2;

Fig. 8 is a fragmentary view, taken similarly to Fig. 6 but drawn to a larger scale, showing the details of construction at the upper end of one of the measuring cylinders; and Figs. 9, 10 and 11 are sectional plan views taken on the lines 9—9, 10—10 and 11—11, respectively, of Fig. 8.

The apparatus includes two measuring cylinders 10, preferably of glass and bottle-shaped, as indicated. These cylinders are open at their upper and lower ends. They are mounted side by side on a common base member 11 which is formed with suitable seats, as shown, to receive said lower ends and close the same except for certain passages later to be described. The upper end of each cylinder is of much smaller cross sectional area than the body thereof and it is seated in a sleeve 12, which forms an axially aligned extension for the neck of the measuring cylinder and, in this case, is or may be non-transparent. The sleeve extensions 12 are both seated in the lower face of a cross bar 13, one near each of two opposite ends thereof. A stud 14, threaded at its lower end into member 11, passes upwardly and centrally through cross bar 13, being provided at its upper end with a nut 15, whereby the two cylinders with their sleeve extensions may be clamped together between member 11 and cross bar 13.

The member 11 is supported on the upper end of a hollow pedestal 16, herein shown as a sheet metal casing. This casing, at its lower end, is mounted on a base 17 (Fig. 1). The casing serves to house the valve mechanism which controls the supply of liquid to and the discharge of liquid from the cylinders 10. It also serves to house any suitabe type of pump. As an example, I have indicated at 18, in Fig. 1, a double-acting pump of the reciprocating piston type. This pump is actuated in any suitable way from a horizontal shaft 19. The latter projects outside casing 16 to receive a lever 20, by means of which shaft 19 may be rocked back and forth. Each oscillating stroke of lever 20 causes one stroke of the piston of pump 18 and the delivery of a certain quantity of liquid therefrom. This pump is adapted to be connected, by a pipe 21 which passes through base 17, to a suitable source of liquid, usually an underground tank. Also passing through base 17 and adapted for connection to said tank is an overflow pipe 22. The discharge port of the pump is connected to a pipe 23, which constitutes part of the supply conduit for the measuring cylinders. Pipes 22 and 23 extend upwardly for connection to member 11 in a manner later to be described.

A suitable register, indicated conventionally at 24, may be provided outside casing 16 for counting the number of dispensing operations in any usual or known manner.

The cylinders 10, in cooperation with the base member 11, afford measuring chambers 25 (Fig. 6). The member 11 is formed with two tubular parts 26 of approximately rectangular cross section, which extend downwardly in spaced parallel relation and afford passages 27, one for each chamber 25. Each passage is part of its measuring chamber and alternately serves for the inflow and outflow of liquid. These two parts 26 are joined together by a valve casing 28, with which the passages 27 communicate by means of ports 29, disposed on opposite sides thereof. The casing 28 is closed at its rear end and is formed to receive a tapered plug valve 30, having an operating shaft 31, extending through a stuffing box in a cap plate 32, which is secured to the casing and serves to close the otherwise open front end thereof. Valve 30 has a curved passage 33 extending therethrough near the front end thereof, which passage is adapted alternately to connect the passages 27 to a discharge passage or conduit 34 formed in member 11. Valve 30 is likewise provided near the rear end thereof with two curved passages 35 (Fig. 7), one of which serves to connect one passage 27 to a supply passage 36, formed in member 11, whenever the other passage 27 is connected by passage 33 to the discharge conduit 34. The other passage 35 serves to connect the last named passage 27 to supply passage 36 whenever the first named passage 27 is connected by passage 33 to the discharge conduit 34. The supply passage 36 is connected to the above described pipe 23,—this pipe and passage constituting a supply conduit. The passage 34 extends outside casing 16, as indicated in Figs. 1 and 6, for connection to the usual delivery hose (not shown). The valve 30 is adapted to turn through an angle of substantially ninety degrees and in a counter-clockwise direction from the extreme position, shown in Figs. 6 and 7, to a second extreme position, in which the connections of the supply and discharge conduits to the measuring chambers are reversed. This valve is adapted to be intermittently moved back and forth between these two positions by suitable quick-acting mechanism to be later described. It never dwells intermediate its extreme positions. The arrangement is a familiar one and such that while one chamber 25 is being supplied with liquid, the other chamber is discharging the liquid previously supplied thereto.

The overflow pipe 22 divides into two branches 22' (Fig. 3) which extend upwardly in parallel relation and are connected at their upper ends to separate cored chambers 38 formed in member 11. An overflow tube 39 (Figs. 2 and 6) is provided for each measuring chamber. Each tube 39 is connected to a chamber 38 and extends upwardly from member 11 into and through the bottle-necked end of its cylinder 10, terminating with its intake end located in the upper part of the measuring chamber and within the sleeve extension 12. The cross bar 13 is hollow and affords a passage 40 through which air may pass from one measuring chamber to another. A vertical passage 41 connects each measuring chamber to passage 40 and valves 42, one for each measuring chamber, control the communication of each of the latter with passage 40.

As best shown in Fig. 8 each valve is of conical form and integral therewith and upstanding therefrom is a guide comprising three webs 43 (see also Fig. 10) which extend radially outwards from a common center and have their outer edges slidingly engaged with the wall of passage 41. A thin plate 44 (see also Fig. 9), less in width than the diameter of passage 41 and greater in length than said diameter, is secured by a screw 45 to the central part of the upper end of the guide. Plate 44 bridges passage 41 and its outer ends rest on the lower wall of passage 40 and serve to support valve 42, while in its open position. An opening, normally closed by a plug 46, is provided in the upper wall of passage 40 to allow access to parts 44 and 45 when required.

The passage 40 is, as shown, closed against the escape of air, wherefore air displaced from one measuring chamber, during the filling thereof with liquid, passes across through passage 40 and down through the then open passage 41 of the other measuring chamber into the latter to assist in the discharge of liquid therefrom. The passage 40 may be provided with an air admission valve 47 of any suitable type to open when the pressure in passage 40 becomes less than atmospheric. Valve 47, as shown, is provided with a very light spring 48 to prevent it from opening by jars or vibration.

The purpose of valve 42 is to close the air outlet of each measuring chamber before liquid can reach and enter the same. For some purposes, it might be allowed to function in the form as thus far described. I prefer, however, to actuate it by a float 49 which is of annular form and loosely encompasses the upper end of overflow pipe 39. Float 49 has a cross bar 50 spanning the vertical opening therethrough and this cross bar is supported by the head of a screw 51, threaded into the lower end of valve 42. There is freedom between the head of screw 51 and the lower end of valve 42 for the cross bar 50 to move vertically for a short distance without moving the valve. The latter is moved by the abutment of bar 50 with the lower end of valve 42. The float 49 is arranged to close valve 42 only after the chamber 25 has been filled to at least the level of the upper and intake end of overflow pipe 39.

Referring now to the mechanism for actuating valve 30, the shaft 31 thereof carries on its outer end a lever 53 which is capable of swinging back and forth through a limited arc between a pair of stops 54, in the shape of lugs formed on a bar 54' secured to the cap plate 32 of the valve casing. When the free end of lever 53 is engaged with the right hand stop 54, valve 30 occupies the position shown in Figs. 6 and 7. When lever 53 is moved to its other extreme position, in which it engages the left hand stop 54, valve 30 will have been turned in a counter-clockwise direction so that the supply and discharge connections to the measuring chambers are reversed. That is, the left hand chamber 25 will be connected to the supply conduit and the right hand chamber to the discharge conduit. The lever 53 is adapted to be moved very rapidly from one extreme position to another by means of a spring 55. The latter encompasses a rod 56 which at one end is pivotally connected to a lever 57 mounted to turn on a stud 58. The other end of rod 56 is slidably engaged in a lug 59 which is mounted to turn in the outer end of lever 53 about an axis parallel to that about which the lever turns. The spring acts between lever 57 and lug 59 and normally tends to hold the latter in one or the other of its extreme positions. The lever 57, which is rocked back and forth by means to be described, serves to compress spring 55 and to gradually change the direction in which the spring presses on lever 53. The lever 57 and rod 56 move like toggle links. As lever 57 moves clockwise from the position shown, it and rod 56 will eventually swing into line so that the center or the pivotal connection between rod 56 and lever 57 will lie in a line which connects the centers of lug 59 and stud 58. When the first named center crosses to the right of said line, spring 55 will be so positioned as to move lever 53 in a counter-clockwise direction. The spring then expands and moves lever 53 in said direction and into abutment with the left hand stop 54. The lever 57, when moved toward the left, will again stress spring 55 and eventually position it so as to move lever 53 in a clockwise direction back into the illustrated position.

The lever 57, which serves merely to stress the valve actuating means and position it for action, is adapted to be rocked back and forth by suitable mechanism from the actuating shaft 19 of pump 18. Lever 57 is an integral part of a bell crank which has two diametrically opposed arms 60, disposed at right angles to the lever. Each arm 60 moves in the path of an adjustable stop 61 mounted in a lug 62 on a frame 63. The abutment of one or the other of arms 60 with stops 61 limits the degree of swinging movement of lever 57. Frame 63, which supports stud 58 and may also support register 24 by means of posts 64 thereon, is supported as indicated from the parallel branches 22' of the overflow conduit. Mounted intermediate its ends on a stud 65, secured to frame 63 at a point vertically below stud 58, is a lever 66, one end of which is connected by a link 67 to one of the arms 60, above described. The other end of lever 66 is connected by a link 68 to a crank pin 69. The latter is mounted for radial adjustment in a slot 70 of a crank 71. Crank 71 is secured as indicated to the hub of a ratchet 72 which is mounted to turn on a stud 73, fixed to a bracket 74, secured by clamps 75 to overflow pipe 22. Two levers 76 are mounted to turn freely on stud 73. They are received between the ratchet and bracket 74 and extend outwardly in opposite directions from stud 74. Each lever 76 is provided with a stud 77 carrying a pawl 78 for cooperation with ratchet 72. A torsion spring 79, coiled around stud 77, is connected at one end to lever 76 and at the other to pawl 78 so as to urge the latter towards the ratchet. A link 80 connects each lever 76 to opposite ends of a crank pin 81 (Fig. 3). The latter, intermediate its ends, is received in a radial slot 82 (Fig. 4) in a crank 83 fixed to shaft 19. A screw 84, mounted to turn but not to move axially, in crank 83 is threaded through pin 81 and serves to adjust the radial position of the latter.

The operation of the apparatus will now be described. In actuating the pump 18, lever 20 is manually rocked back and forth from its mid-position shown. The crank 83 is thus moved up and down from the illustrated position. In the example shown, the maximum arc of movement of crank 83 is approximately sixty degrees. As crank 83 moves upwardly, both links 80 move upwardly, swinging both pawl levers 76 upwardly. This causes the left hand pawl to turn ratchet 72 in a clockwise direction but the right hand pawl moves idly. As crank 83 moves downwardly, the right hand pawl is caused to turn the ratchet and the left hand pawl moves idly. Thus, crank 71 is gradually turned and with it the lever 57 which controls the time of action of the valve operating mechanism. Each half revolution of ratchet 72 causes one cycle of operation of the valve operating mechanism. By adjustment of screw 84, the extent of angular movement of crank 71 may be varied relatively to the extent of angular movement of the pump shaft 19. Each angular increment of the latter results in the pumping of a certain volume of liquid and the adjustment 84 enables one to time the movement of crank 71 with respect to the liquid supplied to a measuring chamber so that valve 30 will not be operated until the liquid has reached at least to the level of the intake of overflow pipe 39. In other words, for each half revolution of crank 71, the volume of liquid pumped can be varied by the adjustment 84. The adjustment of crank pin 69 merely enables one to adjust the throw of the lever 57.

With valve 30 positioned as shown, the operation of the pump causes liquid to flow into the right hand measuring chamber and after the liquid has reached the level of the intake of overflow pipe, or usually a little higher to provide a margin of safety, the valve 30 is automatically reversed. The pumping, being continued without interruption, then causes the left hand measuring chamber to be filled. As this occurs, the right hand chamber is discharging and the air displaced during the filling of the left hand chamber travels across through passage 40 and into the right hand chamber to aid in the rapidity of the discharge of liquid therefrom. As liquid rises in the measuring chamber, the float eventually closes valve 42 and thereafter, if filling continues, the air displaced and the liquid pass into the overflow pipe 39. There is then no pressure of any material degree built up in the glass-walled measuring chamber. As soon as valve 30 operates and connects a filled measuring chamber to the discharge conduit, the valve 42 opens and excess liquid above the level of the intake of pipe 39 drains into the latter. The measured quantity remaining in the chamber is delivered to the customer through the discharge conduit.

The valve operating mechanism has utility in twin cylinder dispensing apparatus varying materially in form from that disclosed. Such mechanism is therefore not necessarily restricted to the particular form of dispensing appartus disclosed. The air venting arrangements, the provision for transfer of air from one measuring chamber to the other, the particular construction of valve 30 and the arrangement of the cooperating passages may be varied in many respects, in so far as the valve operating mechanism is concerned. Such features, although important and preferred, are therefore not necessarily essential so far as all features of the invention are concerned. I therefore wish to have my invention defined by the appended claims rather than by the foregoing description.

What I claim is:

1. A liquid dispensing apparatus, comprising, two measuring chambers, a conduit for the supply of liquid thereto, a conduit for the discharge of liquid therefrom, valve mechanism for alternately connecting said chambers to said supply and discharge conduits arranged so that, when either one is connected to the supply conduit the other is connected to the discharge conduit, a pump for inducing a flow of liquid through the supply conduit, a spring operable when stressed and moved into position to rapidly shift the valve mechanism, and means controlled by said pump for stressing said spring during a predetermined extent of operation of said pump and bringing it into position to shift the valve mechanism after the pump has been operated to said extent.

2. A liquid dispensing apparatus, comprising, two measuring chambers, a conduit for the supply of liquid thereto, a conduit for the discharge of liquid therefrom, valve mechanism for alternately connecting said chambers to said supply and discharge conduits arranged so that when either one is connected to the supply conduit the other is connected to the discharge conduit, a pump for inducing a flow of liquid through the supply conduit, a spring operable when stressed and moved into either one of two predetermined positions to suddenly shift the valve mechanism, a lever operable when moved in one direction to stress said spring and move it into one of said positions and when moved in the opposite direction to again stress the spring and move it into the other of said positions, and connections between said pump and lever for continuously moving said lever back and forth at a speed such that the lever is moved one stroke during the interval in which a measuring chamber is being filled by said pump.

3. A liquid dispensing apparatus, comprising, two measuring chambers, a conduit for the supply of liquid thereto, a conduit for the discharge of liquid therefrom, valve mechanism for alternately connecting said chambers to said supply and discharge conduits arranged so that when either one is connected to the supply conduit the other is connected to the discharge conduit, a pump for inducing a flow of liquid through the supply conduit, a spring operable when stressed and moved into either one of two predetermined positions to suddenly shift the valve mechanism, a lever operable when moved in one direction to stress said spring and move it into one of said positions and when moved in the opposite direction to again stress the spring and move it into the other of said positions, an oscillatory member for operating said pump, a crank connected to swing said lever back and forth, and pawl and ratchet mechanism for operating said crank from said oscillatory member.

4. A liquid dispensing apparatus, comprising, two measuring chambers, a conduit for the supply of liquid thereto, a conduit for the discharge of liquid therefrom, valve means for alternately connecting said chambers to the supply and discharge conduits and arranged so that when either chamber is connected to the supply conduit the other is connected to the discharge conduit, a pump for producing a continuous flow of liquid through said supply conduit, an overflow conduit for each chamber for withdrawing therefrom all liquid above a predetermined level therein, an air conduit connecting said chambers and communicating with each at a point above said level, a valve for each chamber to control communication of the latter with said air conduit and operable by rise of liquid above said level to close such communication, a drive spring for said valve means operable when stressed and moved into effective position to shift said valve means substantially instantaneously, and means controlled by said pump for stressing said spring during a predetermined extent of operation thereof sufficient to cause one of said chambers to be filled to a level above said predetermined level and for bringing it into position to shift said valve means at the end of said predetermined extent of operation.

In testimony whereof I have affixed my signature.

JOHN B. DAVIS.